US011782862B2

(12) United States Patent
Kempf et al.

(10) Patent No.: US 11,782,862 B2
(45) Date of Patent: Oct. 10, 2023

(54) METHOD OF ASSIGNING ADDRESSES TO BUS PARTICIPANTS

(71) Applicant: Schneider Electric Industries SAS, Rueil-Malmaison (FR)

(72) Inventors: Johannes Kempf, Klingenberg am Main (DE); François Gorisse, Mougins (FR); Maxime Sobocinski, Le Golfe Juan (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 11 days.

(21) Appl. No.: 17/205,003

(22) Filed: Mar. 18, 2021

(65) Prior Publication Data

US 2021/0294771 A1    Sep. 23, 2021

(30) Foreign Application Priority Data

Mar. 19, 2020  (EP) .................................... 20164142

(51) Int. Cl.
*G06F 13/40*        (2006.01)

(52) U.S. Cl.
CPC ........ *G06F 13/4068* (2013.01); *G06F 13/409* (2013.01)

(58) Field of Classification Search
CPC ........................... G06F 13/4068; G06F 13/409
See application file for complete search history.

(56) References Cited

U.S. PATENT DOCUMENTS

| | | | | |
|---|---|---|---|---|
| 3,881,174 A | * | 4/1975 | Barnich | .................. G06F 13/24 |
| | | | | 710/48 |
| 4,038,642 A | * | 7/1977 | Bouknecht | .............. G06F 13/26 |
| | | | | 710/20 |

(Continued)

FOREIGN PATENT DOCUMENTS

| | | | |
|---|---|---|---|
| DE | 4033176 | * | 7/1991 |
| DE | 40 38 992 C1 | | 2/1992 |

(Continued)

OTHER PUBLICATIONS

European Search Report dated Sep. 4, 2020 in European Patent Application No. 20164142.0, 9 pages.

(Continued)

*Primary Examiner* — Alexander Satanovsky
*Assistant Examiner* — Sharah Zaab
(74) *Attorney, Agent, or Firm* — Oblon, McClelland, Maier & Neustadt, L.L.P.

(57) ABSTRACT

The invention relates to a method of assigning addresses to bus participants connected to a data bus, in which
 the bus participants are electrically and in particular also mechanically coupled to a respective base plate, with the base plates each comprising an electrical test element;
 the base plates are electrically connected along a row to adjacent base plates in each case, with the base plates forming a test circuit in which the test elements are preferably connected in series;
 a central unit is connected to the test circuit;
 a test current is impressed into the test circuit;
 at least one bus participant, in particular a bus participant without a bus address, makes a change to the test circuit;
 the change of the test circuit is measured by means of the central unit; and (Continued)

Figure 1:
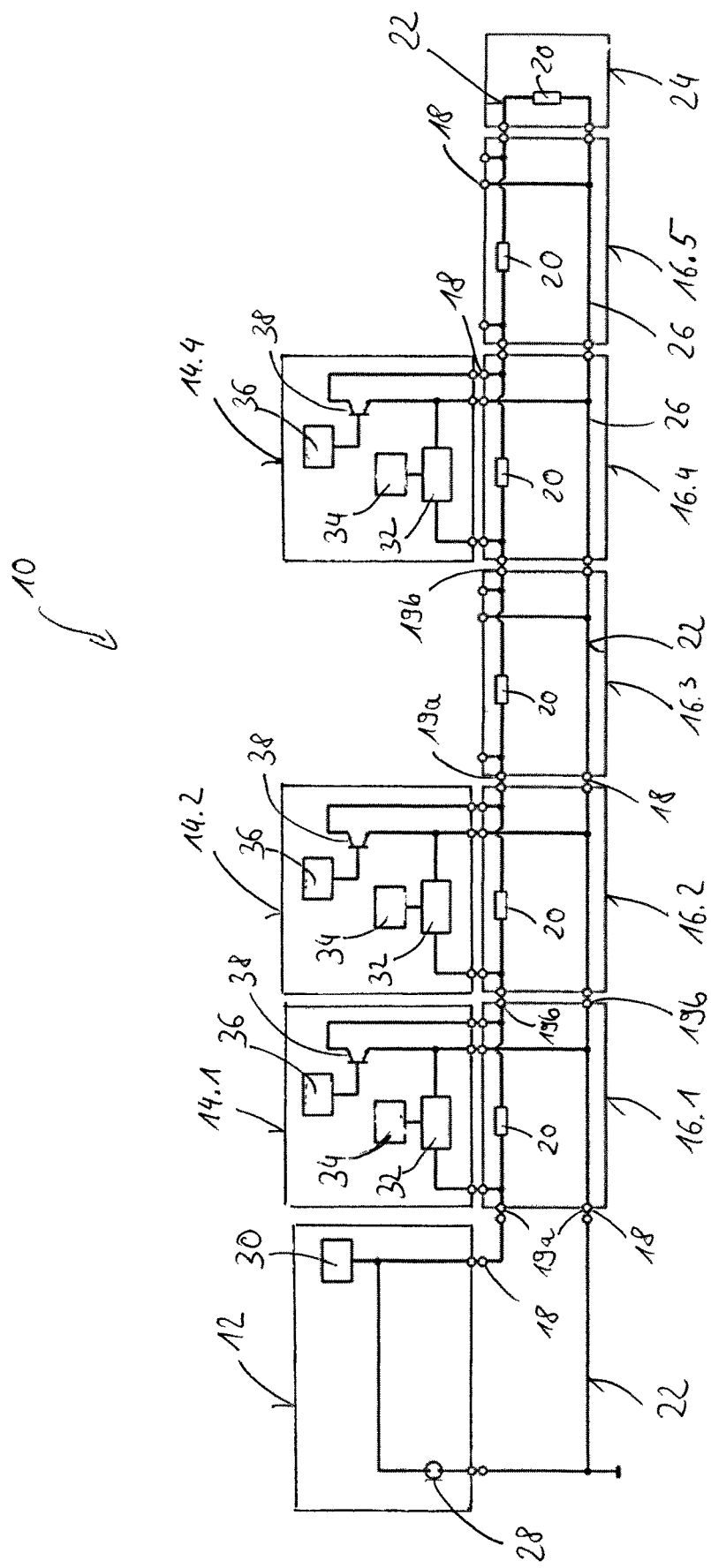

based on the change of the test circuit, a position of the bus participant making the change or of the bus participant without a bus address is determined and a bus address is assigned to the bus participant making the change or to the bus participant without a bus address.

19 Claims, 2 Drawing Sheets

(56) References Cited

U.S. PATENT DOCUMENTS

| | | | |
|---|---|---|---|
| 4,635,192 A | * | 1/1987 | Ceccon ................. G06F 13/409 710/301 |
| 2003/0167360 A1 | | 9/2003 | Heinrich et al. |
| 2005/0220127 A1 | | 10/2005 | Cane et al. |
| 2005/0271077 A1 | | 12/2005 | Hartzsch |
| 2008/0177919 A1 | | 7/2008 | Miyazawa |
| 2008/0307131 A1 | | 12/2008 | Simon |
| 2009/0235124 A1 | | 9/2009 | Schmidt |
| 2012/0059959 A1 | | 3/2012 | Simon |
| 2017/0185553 A1 | | 6/2017 | Simon |

FOREIGN PATENT DOCUMENTS

| | | | |
|---|---|---|---|
| DE | 4038992 | * | 2/1992 |
| DE | 101 47 512 A1 | | 4/2003 |
| DE | 10147512 | * | 4/2003 |
| DE | 103 10 250 A1 | | 11/2004 |
| DE | 10 2005 056 294 A1 | | 6/2007 |
| DE | 10 2007 041 941 A1 | | 5/2008 |
| DE | 10 2007 028 928 A1 | | 1/2009 |
| DE | 10 2008 044 777 A1 | | 3/2010 |
| DE | 10 2013 018 282 A1 | | 5/2015 |
| DE | 10 2015 107 865 A1 | | 11/2016 |
| EP | 0 806 751 A1 | | 11/1997 |
| EP | 1134669 | * | 9/2001 |
| EP | 1 284 556 A1 | | 2/2003 |
| EP | 2 154 831 A1 | | 2/2010 |
| EP | 3 461 069 A1 | | 3/2019 |
| WO | WO 03/094001 A1 | | 11/2003 |

OTHER PUBLICATIONS

European Office Action dated Dec. 18, 2020 in European Patent Application No. 20164142.0, 6 pages.

* cited by examiner

METHOD OF ASSIGNING ADDRESSES TO BUS PARTICIPANTS

The present invention relates to a method of assigning addresses to bus participants connected to a data bus.

A large number of field devices, for example I/O modules, which monitor and control the industrial process, are required for automated industrial processes. The I/O modules are in turn e.g. controlled by means of a programmable logic controller (PLC) via a data bus. The PLC can in this respect address different bus participants via their respective bus addresses.

On the installation of the bus participants, bus addresses have to be assigned to the bus participants for this purpose, said bus addresses preferably also reflecting the respective physical position of the bus participant. Such an assignment of bus addresses to bus participants can be associated with a high effort. In addition, it may be necessary to repeat the assignment of addresses as soon as a change is made to the bus participants.

It is therefore the underlying object of the invention to simplify the assignment of addresses to bus participants connected to a data bus.

This object is satisfied by a method in accordance with claim 1.

In the method in accordance with the invention,
the bus participants are electrically and in particular also mechanically coupled to a respective base plate, with the base plates each comprising an electrical test element;
the base plates are electrically connected along a row to adjacent base plates in each case, with the base plates forming a test circuit in which the test elements are preferably at least partly connected in series;
a central unit is connected to the test circuit;
a test current is impressed into the test circuit;
at least one bus participant, in particular a bus participant without a bus address, makes a change to the test circuit;
the change of the test circuit is measured by means of the central unit;
based on the change of the test circuit, a position of the bus participant making the change or of the bus participant without a bus address is determined and a bus address is assigned to the bus participant making the change (or to the bus participant without a bus address).

The invention is based on the basic idea that by changing the test circuit, the position of the bus participant without a bus address can e.g. be determined, in particular if the bus participant without a bus address makes the change. Alternatively, it is naturally also possible that (e.g. all) bus participants with an address make the change and it can then be recognized which bus participants do not make a change and accordingly do not yet have a bus address.

In general, it can be recognized from the change that at least one bus participant without a bus address exists. In addition, the position of this bus participant can, for example, be determined in an automated manner so that a bus address can then be assigned to the bus participant without a bus address. Accordingly, the assignment of the bus addresses can take place automatically. In addition, it is possible to assign a bus address that corresponds to the physical position on the basis of the recognized physical/mechanical position of the bus participant.

The detection of the physical position is in this respect in particular made possible by the test elements in the base plates. The test elements are preferably known to the central unit so that it can be concluded from the characteristics of the test circuit (i.e., e.g. from the test current) where the bus participant without a bus address is arranged.

Further details of the method in accordance with the invention will be described in the following.

The central unit can in particular be part of a programmable logic controller (PLC) or it can be connected thereto. The central unit can, for example, also serve as a bus coupler that provides the bus participants as a single fieldbus device or as a plurality of fieldbus devices in a fieldbus. In this case, the PLC can then communicate via the fieldbus with the central unit acting as a bus coupler.

The base plate can in particular be an element which is arranged adjacent to or adjoining the respective bus participant and to which the bus participant can in particular also be mechanically fastened. The base plates can at least regionally be plate-shaped and can preferably be electrically connected to one another along a row. In this respect, the base plates can be connected to one another directly or via electrical lines. For example, each base plate can have two input contacts and two output contacts, wherein the test element can be connected between one input contact and one output contact, whereas the remaining contacts can be electrically connected to one another in a direct manner (return line). After the last base plate, a termination element can also be provided that electrically connects the two output contacts of the last base plate. The termination element can likewise have a test element in the connection. The termination element can thus terminate the test circuit at one side of the row of the base plates, whereas the central unit terminates or closes the test circuit at the side disposed opposite the termination element.

Exactly one test element and/or exactly one base plate is preferably present for each bus participant. Therefore, there is in particular a 1:1 relationship between bus participants and test elements and/or base plates.

The central unit is then connected to the test circuit, wherein in particular the central unit imparts a test current into the test circuit, e.g. by applying a fixed voltage.

During the imparting of the test current, it can be communicated to the bus participants that bus participants without a bus address are now to be determined. Thereupon, the bus participants without a bus address (or, as described above, alternatively e.g. all the bus participants with a bus address) can make a change to the test circuit. For example, the test circuit can be short-circuited by the bus participants without a bus address so that the test circuit is then "shortened" and only a few test elements are electrically active in the test circuit. The change at the test circuit can then be measured by the central unit, for example by detecting a changed voltage drop or a changed test current.

Based on the change, it can be determined by the central unit which bus participant or participants does/do not yet have a bus address. It can e.g. be recognized that, in the case of a "shortened" test circuit, a bus participant without a bus address must be arranged at the end of this shortened test circuit.

Bus address(es) can then be assigned to the bus participant(s) recognized in this manner. A bus address can, for example, be an IP address or an Ethernet address or a CAN identifier.

Advantageous further developments of the invention can be seen from the description, from the drawings and from the dependent claims.

In accordance with an embodiment, the change by the bus participant making the change comprises short-circuiting the test circuit. The short-circuiting in this respect in particular takes place such that all the base plates (viewed from the central unit) and thus also test elements that are arranged after the bus participant making the change are electrically removed from the test circuit. Due to the short-circuiting, the central unit can thus temporarily only detect the test elements up to the bus participant making the change, whereby the test circuit is changed. Due to the change that can be measured in this way, the mechanical position of the bus participant making the change that is closest to the central unit (i.e. in the order of the base plates) can be detected.

The change does not necessarily have to be a short-circuiting of the test circuit. The change could, for example, also take place by feeding current or voltage, setting a point of the test circuit to a reference potential or the like. The change can generally be of any desired nature as long as it is visible for the central unit where a bus participant, e.g. a first bus participant, is positioned that makes the change. It must in particular also be visible for subsequent bus participants that a previous bus participant has already made a change.

In accordance with a further embodiment, the change of the test circuit takes place in response to a request message of the central unit, wherein the request message is preferably sent as a broadcast. In response to the request message, the change of the test circuit is further preferably made by the bus participants to which no bus address has yet been assigned. The request message can preferably be sent via the data bus by broadcast since bus participants without an already assigned bus address can also receive a broadcast. A broadcast can also be designated as a broadcast message that is intended to be received and processed by all the bus participants. In response to the broadcast, all the participants that do not yet have a bus address can make a change to the test circuit.

If the test circuit, for example, comprises ten base plates comprising a corresponding number of test elements and the test circuit is short-circuited by a bus participant on base plate #3, the central unit can, for example, only detect the first three test elements (i.e. the test elements of the base plates #1 to #3). It is hereby then visible to the central unit that the first bus participant without a bus address is seated on base plate #3, whereby a suitable bus address can then be assigned to this bus participant, as stated below.

In general, after the request message and the change of the test circuit by one or more bus participants, a determination of the position of at least one bus participant making the change is performed, wherein in particular the determination of the position of the first bus participant or of the bus participant making the change that is closest to the central unit takes place.

In accordance with a further embodiment, after the determination of the position of the bus participant, in particular of the first bus participant, making the change, the bus address is assigned by means of an assignment message that is preferably sent as a broadcast. After the bus participant has made the change to the test circuit, the assignment message then arrives via the data bus, whereupon the bus participant then takes over the bus address included in the assignment message.

In accordance with a further embodiment, in order to detect whether a change of the test circuit is made by a bus participant closer to the central unit, a voltage is determined at the test element of the base plate of the respective bus participant, in particular by means of a comparator. If the voltage is zero, i.e. if, for example, there is no current at a test element configured as a resistor, the bus participant is not the bus participant disposed closest to the central unit that has made a change. In this case, the bus participant does not take over the bus address included in the assignment message. In this manner, it is prevented that a plurality of bus participants take over the same bus address.

The comparator preferably digitizes the voltage at the test element, wherein the comparator can in particular be connected to a first GPIO pin (General Purpose Input Output Pin) of the bus participant. The first GPIO pin can also be configured as an input. The implementation on the part of the bus participants is hereby greatly simplified since a taking over of the bus address included in the assignment message only takes place when a high level is e.g. applied to the GPIO pin.

The change of the test circuit can take place via a second GPIO pin of the bus participant that is configured as an output. A base or a gate of a transistor can e.g. be connected to the second GPIO pin and is connected between the input contact or the output contact of the base plate of the respective bus participant in order e.g. to selectively cause a short circuit between both input contacts or both output contacts. If the transistor is then conductively connected by means of the second GPIO pin, a short circuit results so that a change of the test circuit is present. After the bus participant has taken over the bus address, the changing of the test circuit is preferably terminated so that other bus participants can then obtain their bus address by means of the same method steps.

It is understood that additional electrical components can also be coupled into the test circuit (or also decoupled) by the transistor so that a change of the test circuit, which in particular does not comprise a short circuit, is then present in this way.

In accordance with a further embodiment, the transfer of the data bus to the bus participants and to the central control also takes place by means of the base plate. The base plate can therefore have transmission means for the data bus, for example two or four further lines for a CAN bus (Controller Area Network Bus). The data bus can in particular also be a field bus such as the CANopen bus. However, other fieldbuses such as SERCOS, Ethernet/IP and the like are also conceivable. However, it is understood that other communication buses can also be used as data buses, independently of the protocol used.

In accordance with a further embodiment, the test element comprises a respective ohmic resistor and/or a diode. Furthermore, the test elements of the base plates are preferably each identical.

The test elements of the base plates can be known to the central unit. Due to the known test elements, the central unit can then determine in the case of a known imparted/impressed test current or of a known voltage applied to the test circuit how many and/or which test elements are currently electrically active in the test circuit. If, for example, only three test elements are electrically active in the test circuit on a short-circuiting by the bus participant on base plate #3, the central unit will be able to determine a lower voltage with the same impressed test current than if, for example, ten test elements are electrically active in the test circuit. The mechanical position of the bus participant making the change can in particular be determined from the voltage applied to the test circuit and/or from the current of the test circuit.

The test element can generally also be another passive component such as coils or capacitors. In this case, the test current can be an alternating current, for example. The imparting of a test current is to be understood such that the central unit applies a predetermined voltage to the test circuit or imparts a predetermined current into the test circuit. The central unit can measure the voltage and/or the current at/in the test circuit.

It is likewise possible that the test elements are active components, for example voltage sources or current sources. In this respect, it is then e.g. possible for the central unit to measure the cumulative voltage that is generated by the various voltage sources in the test circuit. In this respect, the voltage would then be the higher, the more test elements are electrically active in the test circuit at a point in time.

Alternatively or additionally, the test elements can also cause a time change of the test circuit and/or of the test current so that a time delay and/or a clock influencing of a clocked test current can e.g. take place.

In accordance with a further embodiment, it is recognized whether one or more base plates without bus participants are present. The recognition can in particular be performed by the central unit. For this purpose, a list of all the assigned and non-assigned addresses can be maintained (e.g. by the central unit). It can then be seen from the list on which base plates there is no bus participant. All the bus participants can in particular also briefly make a change to the test circuit after one another (e.g. in response to a request by the central unit) to keep the list up to date in this manner.

In accordance with an embodiment, a position of at least one base plate without bus participants can then also be determined from the list. The mechanical position of empty base plates can hereby preferably be known. This can then e.g. be displayed in a planning tool.

As already mentioned, a termination element, which closes the test circuit, can be provided after the last base plate in accordance with an embodiment. An absence of the termination element can preferably be recognized by the central unit. The absence can in particular be recognized by a completely interrupted current flow in the test circuit.

In accordance with a further embodiment, the method is performed repeatedly, in particular until a bus address has been assigned to all the bus participants. At least the steps of changing the test circuit, sending the assignment message and taking over the bus address from the assignment message are preferably performed repeatedly by the bus participant without a bus address that is closest to the central unit.

To summarize the processes, a system in which ten base plates are present, with each base plate being connected to a bus participant, will be assumed by way of example in the following. For this example, it is assumed that only the bus participants on base plate #3 and base plate #6 do not yet have a bus address. It is further assumed that the central unit applies a constant voltage to the test circuit and that the test elements in all the base plates are identical ohmic resistors. To now assign bus addresses to the bus participants on base plate #3 and #6, a request message is sent by the central unit by broadcast to all the bus participants, whereupon the bus participants #3 and #6 each short-circuit the test circuit at their base plate. Since the bus participant #3 is closer to the central unit, all the bus participants behind the bus participant #3 (thus also the bus participant #6) become electrically ineffective for the test circuit, whereby the central unit recognizes that only three resistors (i.e. the resistors up to base plate #3) are electrically active in the test circuit. This is reflected in a corresponding current change in the test circuit. The central unit can then determine from the current of the test circuit that the bus participant on base plate #3 does not yet have a bus address. The bus address (e.g. bus address #3) for the bus participant on base plate #3 is then transmitted by means of an assignment message by broadcast to all the bus participants. The bus participants that already have a bus address then ignore this message. The bus participant #6 also ignores the message since it recognizes by means of the comparator and the first GPIO pin that a bus participant closer to the central unit should receive this address. The bus participant #3 recognizes via its first GPIO pin, which is at a high level, that it is the bus participant without a bus address that is closest to the central unit and it takes over the bus address from the assignment message. The bus participant #3 then terminates the short-circuiting of the test circuit. Due to the termination of the short-circuiting by the bus participant #3, all the test elements up to the bus participant #6 now become electrically active in the test circuit. The current in the test circuit hereby changes again so that the central unit can now recognize that the bus participant #6 does not yet have a bus address. The bus address (e.g. the bus address #6) for the bus participant #6 is then again sent by broadcast by means of an assignment message and is taken over by the bus participant #6. After the bus participant #6 has received the bus address, it also terminates the short-circuiting of the test circuit. The central unit can thereupon recognize based on the current, which has changed again, in the test circuit that all the test elements are now electrically active in the test circuit. Accordingly, there is no longer a bus participant that does not have a bus address.

The request message is further preferably repeatedly and/or cyclically sent by the central unit. It is then hereby possible for newly added devices (e.g. by means of a hot swap) to obtain a bus address in an automated manner and to thus be able to be integrated into the system. It is likewise possible for the current and/or the voltage of the test circuit to be measured permanently or repeatedly by the central unit in order to detect new bus participants. New bus participants can in particular draw attention to themselves by making a change to the test circuit. The method described herein can then be performed again on the recognition of a new bus participant.

In accordance with a further embodiment, the bus participants are releasably connected to the respective base plate and are in particular electrically coupled to the respective base plate by means of plug connectors. The bus participants can preferably e.g. be clipped onto the base plate, wherein the bus participants can preferably be released from the base plate again without tools. On the connection or fastening of a bus participant to the respective base plate, the electrical connections between the bus participant and the test circuit as well as between the bus participant and the data bus can in particular be automatically established.

In accordance with a further embodiment, the data bus is a field bus and/or at least some of the bus participants are input-output modules (I/O modules). Accordingly, the bus participants can be field devices.

A further subject of the invention is a system comprising a central unit and a plurality of bus participants, which are each electrically and in particular also mechanically coupled to a base plate, with the bus participants being connected to a data bus, wherein the base plates each comprise an electrical test element;
the base plates are electrically connected along a row to adjacent base plates in each case, whereby the base plates form a test circuit in which the test elements are preferably connected in series;
the central unit is connected to the test circuit;
a test current is impressed into the test circuit;
at least one bus participant, in particular a bus participant without a bus address, is configured to make a change to the test circuit;

the central unit is configured to measure the change of the test circuit;

the central unit is configured to determine, based on the change of the test circuit, a position of the bus participant making the change or of the bus participant without a bus address and to assign a bus address to the bus participant making the change or to the bus participant without a bus address.

The statements on the method in accordance with the invention apply accordingly to the system in accordance with the invention. This in particular applies with respect to advantages and embodiments.

Figure 2:
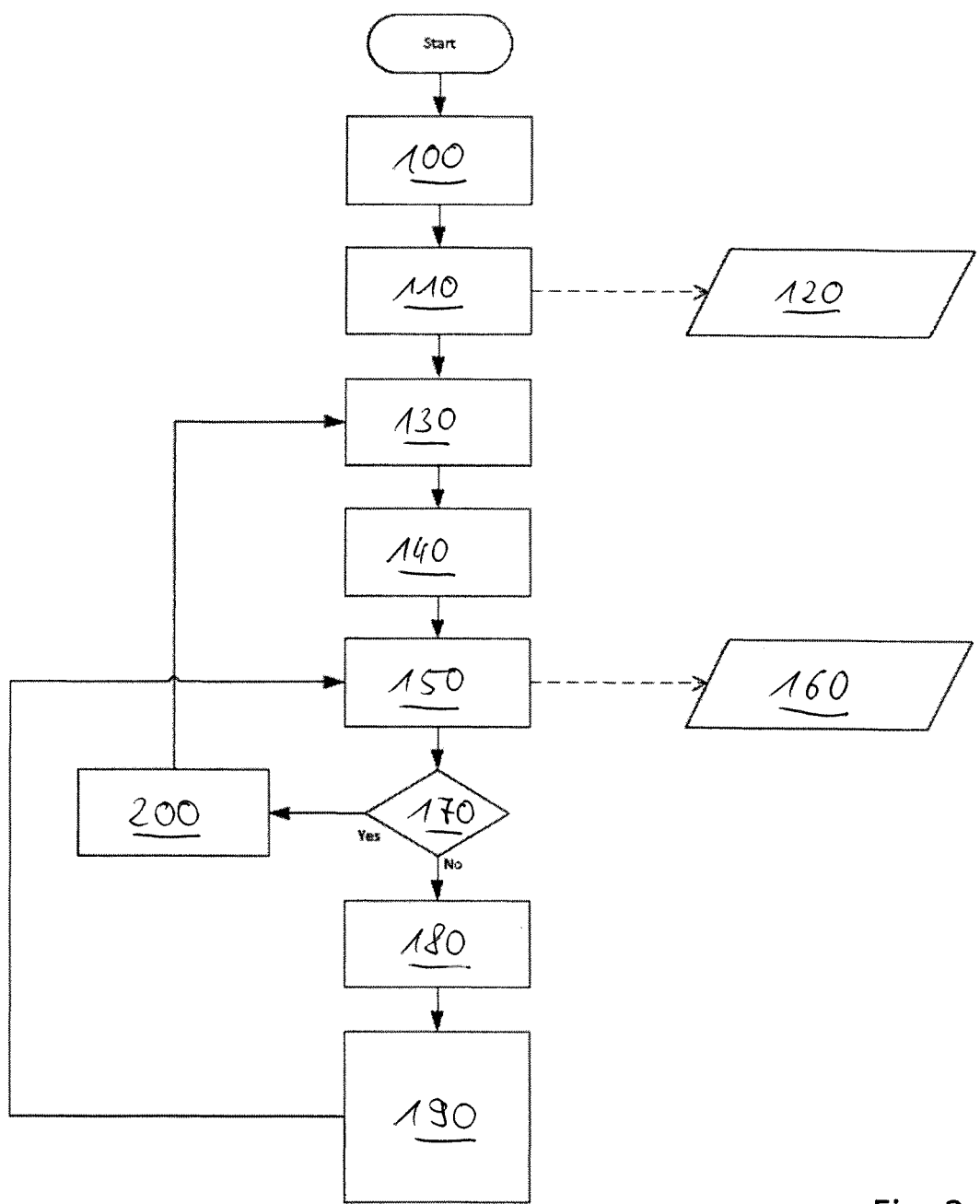

The invention will be described in the following purely by way of example with reference to drawings. There are shown:

FIG. 1 a system comprising a central unit and a plurality of bus participants attached to base plates; and FIG. 2 shows a flow chart for assigning bus addresses to the bus participants.

FIG. 1 shows a system 10 that has a central unit 12 and three bus participants 14.1, 14.2 and 14.4.

The bus participants 14 are fastened to base plates 16, wherein five base plates 16.1, 16.2, 16.3, 16.4 and 16.5 are shown by way of example in FIG. 1. The central unit 12 and the bus participants 14 are electrically connected to the base plates 16 by means of plug connectors 18. The base plates 16 are also electrically coupled to one another by means of plug connectors 18.

The two plug connectors 18 of a respective base plate 16 that face the central unit 12 serve as input contacts 19a, whereas the two plug connectors 18 of a respective base plate 16 that are remote from the central unit 12 act as output contacts 19b.

Each base plate 16 comprises a test element that is shown in the form of a test resistor 20 here. The test resistor 20 is in each case arranged between two connectors 18 and forms a supply line in a test circuit 22. The test circuit 22 additionally comprises a termination element 24, wherein the termination element 24 likewise comprises a test resistor 20 that establishes a connection to return lines 26 in the base plates 16.

The test resistors 20 each have an ohmic resistance of 100 Ω.

In the central unit 12, a current source 28 is connected into the test circuit 22 and imparts a constant test current of 3 mA into the test circuit.

The central unit 12 additionally comprises an analog-to-digital converter (ADC) 30 that detects the voltage currently present at the test circuit 22.

Each bus participant 14 furthermore comprises a comparator 32 that detects a voltage that is applied to the base plate 16 in each case or a current in the test circuit 22. The comparator 32 can be read out via a first GPIO pin 34.

A second GPIO pin 36 controls a respective transistor 38 of the respective bus participant 14. A short-circuiting of the test circuit 22 after the respective test resistor 20 can take place by means of the transistor 38.

For the sake of a better overview, a data bus, e.g. a CAN bus, via which the central unit 12 and all the bus participants 14 communicate with one another is not shown in the Figures.

FIG. 2 now shows the sequence of the assignment of addresses to the bus participants 14. For the following example, it is assumed that only the bus participant 14.1 already has a bus address and that the bus participants 14.2 and 14.4 do not yet have a bus address.

As long as the bus participants have not yet received a request message from the central unit 12, the second GPIO pins 36 are deactivated in step 100 so that no short-circuiting of the test circuit 22 takes place. In step 110, the central unit 12 then determines the instantaneous voltage at the test circuit 22 by way of the ADC 30. A conclusion on the number of base plates 16 can then hereby be drawn in step 120. In step 130, the central unit 12 sends a request message as a broadcast via the data bus, said request message requesting bus participants 14 without a bus address to identify themselves. In step 140, in response to the request message, the bus participants 14.2 and 14.4 switch the transistors 38, by activating the second GPIO pin 36, into a conductive state in each case. A short circuit between the output contacts 19b is hereby produced.

In step 150, the central unit 12 thereupon again measures the voltage at the test circuit 22. Based on the voltage now measured, it is recognized in step 160 which one is the closest bus participant 14 without a bus address. In the present example, it is recognized that the voltage measured by the ADC 30 indicates that only two test resistors 20 are electrically active in the test circuit 22 at this point in time. It hereby results in step 160 that two base plates are currently "detectable". In step 170, the number of detectable base plates is now compared with the number of originally determined base plates. In the present example, if the number is different, the bus address for the bus participant 14.2 is sent by means of a broadcast message (assignment message) in step 180 for the bus participant 14.2. Since the bus participant 14.2 can recognize by means of its comparator that it is the bus participant 14 without a bus address closest to the central unit 12, the bus participant 14.2 takes over the bus address in step 190 and confirms the reception by means of a further broadcast. The reception can alternatively also be acknowledged by a regular message, in particular if the address of the central unit 12 is known to the bus participant 14.2. Subsequently, the bus participant 14.2 deactivates its second GPIO pin 36, whereby the short-circuiting is terminated by the second bus participant 14.2. The method now again runs through the steps 150 to 190 in order to also assign its address to the bus participant 14.4.

By assigning the addresses to the bus participants 14.2 and 14.4, it results for the central unit that the base plate 16.3 is empty and does not have a bus participant.

If it is determined in step 170 after the assignment to the bus participant 14.4 that the now measured number of base plates 16 corresponds to the expected number of base plates 16 from step 120, it is proceeded to step 200 in which it is waited for a predetermined time before new bus participants without a bus address are again looked for in step 130. The transition from step 200 to step 130 in particular enables the hot swapping of additional bus participants 14.

It can be recognized that an automatic recognition of the mechanical position of bus participants 14 by the central unit 12 is made possible by the provision of test elements, i.e. test resistors 22, in the base plates 16. An assignment of addresses to bus participants 14 can hereby take place in an automated manner, wherein the assignment of addresses is also oriented toward the actual physical position of the bus participants 14.

REFERENCE NUMERAL LIST 10 system
12 central unit
14 bus participant
16 base plate 18 plug connector
19a input contact
19b output contact
20 test resistor
22 test circuit
24 termination element
26 return lines
28 current source
30 ADC
32 comparator
34 first GPIO pin
36 second GPIO pin
38 transistor
100 deactivating second GPIO pins 36
110 voltage measurement by ADC 30
120 determining number N of base plates 16
130 sending request message
140 short-circuiting by activating the second GPIO pin 36
150 measuring voltage at the test circuit 22 by means of ADC 30
160 determining the number A of base plates that are still electrically active in the test circuit 22
170 comparison whether N=A
180 sending the bus address by means of an assignment message
190 taking over the bus address, confirming and deactivating the second GPIO pin 36
200 waiting time until the recognition of newly added bus participants 14

The invention claimed is:

1. A method of assigning addresses to bus participants connected to a data bus, in which
the bus participants are electrically coupled to a respective base plate, with the base plates each comprising an electrical test element;
the base plates are electrically connected along a row to their adjacent base plates;
a central unit is connected to a test circuit;
a test current is impressed into the test circuit;
at least one bus participant makes a change to the test circuit;
the change of the test circuit is measured by means of the central unit; and
the method comprising:
determining, by means of the central unit and based on the change of the test circuit, a position of the bus participant making the change or of a bus participant without a bus address and assigning a bus address to the bus participant making the change or to the bus participant without a bus address,
wherein the bus participants are also mechanically coupled to the respective base plate.

2. The method in accordance with claim 1,
wherein the base plates form the test circuit in which the test elements are connected in series.

3. The method in accordance with claim 1,
wherein the at least one bus participant making the change to the test circuit, is a bus participant without a bus address.

4. The method in accordance with claim 1,
wherein the change by the bus participant making the change comprises short-circuiting the test circuit.

5. The method in accordance with claim 1,
wherein the change of the test circuit takes place in response to a request message of the central unit, wherein, in response to the request message, the change of the test circuit is made by the bus participants to which no bus address has yet been assigned.

6. The method in accordance with claim 5,
wherein the request message is sent as a broadcast.

7. The method in accordance with claim 1,
wherein, after the determination of the position of the bus participant making the change, the bus address is assigned by means of an assignment message that is sent as a broadcast.

8. The method in accordance with claim 7,
wherein the assignment message is sent as a broadcast.

9. The method in accordance with claim 7,
wherein it is detected by the bus participants without a bus address whether a bus participant closer to the central unit makes a change to the test circuit, wherein the bus address transmitted by the assignment message is taken over by that bus participant without a bus address that is closest to the central unit.

10. The method in accordance with claim 9,
wherein, in order to detect whether a change of the test circuit is made by a bus participant closer to the central unit, a voltage is determined at the test element of the base plate of the respective bus participant, in particular by means of a comparator.

11. The method in accordance with claim 1,
wherein a transfer of the data bus to the bus participants and to the central control also takes place by means of the base plate.

12. The method in accordance with claim 1,
wherein the test element comprises a respective ohmic resistor and/or a diode and the test elements of the base plates are identical.

13. The method in accordance with claim 1,
wherein it is recognized whether base plates without bus participants are present.

14. The method in accordance with claim 13,
wherein a position of at least one base plate without bus participants is determined.

15. The method in accordance with claim 1,
wherein a termination element, which closes the test circuit, is provided after the last base plate,
wherein an absence of the termination element can be recognized by the central unit.

16. The method in accordance with claim 1,
wherein the method is performed repeatedly, until a bus address has been assigned to all the bus participants.

17. The method in accordance with claim 1,
wherein the bus participants are releasably connected to the respective base plate and are electrically coupled to the respective base plate by means of plug connectors.

18. The method in accordance with claim 1,
wherein the data bus is a field bus and/or at least some of the bus participants are input-output modules.

19. A system comprising a central unit and a plurality of bus participants, which are each electrically coupled to a base plate, with the bus participants being connected to a data bus, wherein
the base plates each comprise an electrical test element;
the base plates are electrically connected along a row to adjacent base plates in each case, whereby the base plates form a test circuit;
the central unit is connected to the test circuit;
a test current is impressed into the test circuit;
at least one bus participant is configured to make a change to the test circuit;
the central unit is configured to measure the change of the test circuit; and the central unit is configured to determine, based on the change of the test circuit, a position of the bus participant making the change or of a bus participant without a bus address and to assign a bus address to the bus participant making the change or to the bus participant without a bus address, wherein the bus participants are also mechanically coupled to the respective base plate.

\* \* \* \* \*